April 7, 1953
E. L. POTTS ET AL
2,633,739
APPARATUS FOR PRESSURE TESTING VESSELS, SUCH
AS PIPE AND THE LIKE
Filed March 3, 1949
3 Sheets-Sheet 1
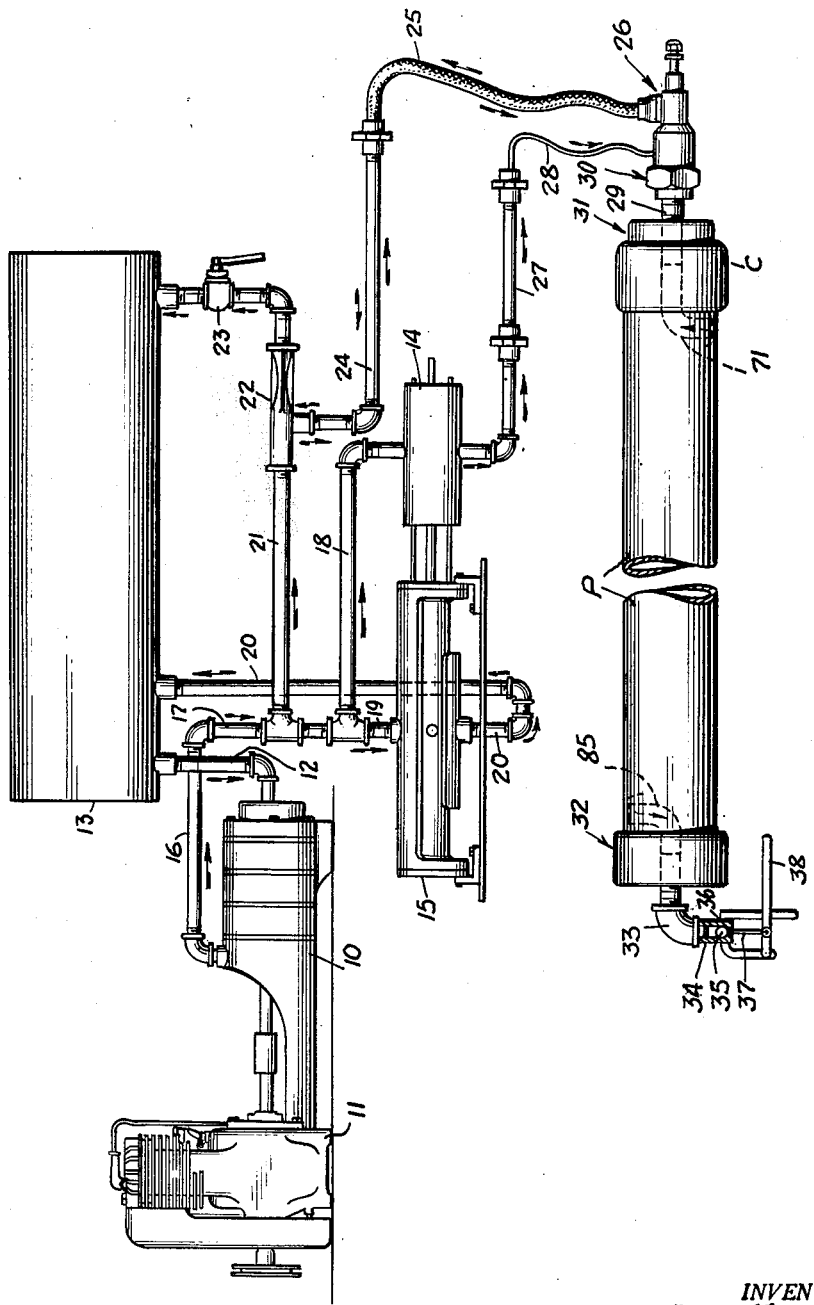
INVENTOR.
E. L. Potts &
BY F. L. Scott, Jr.
ATTORNEY

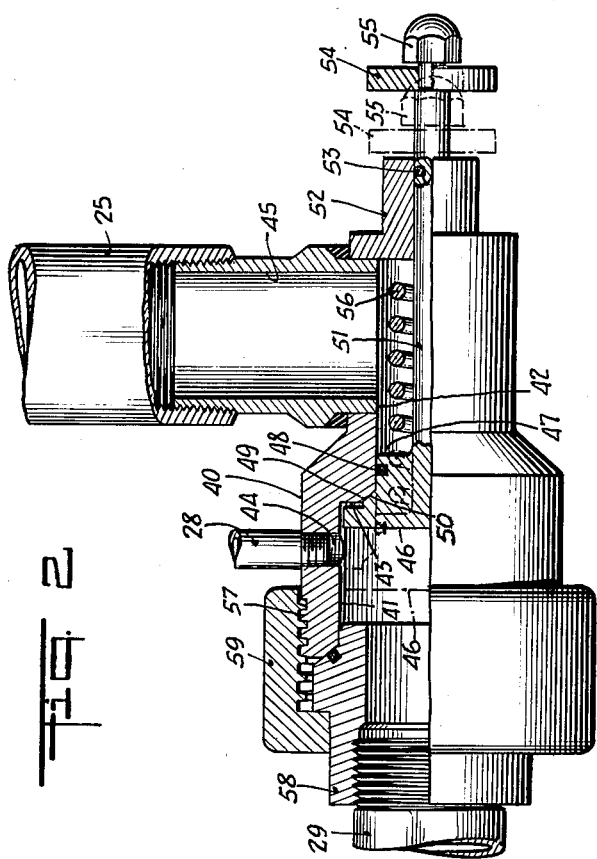
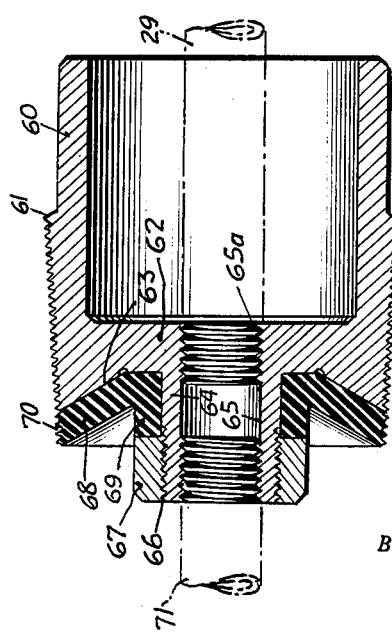

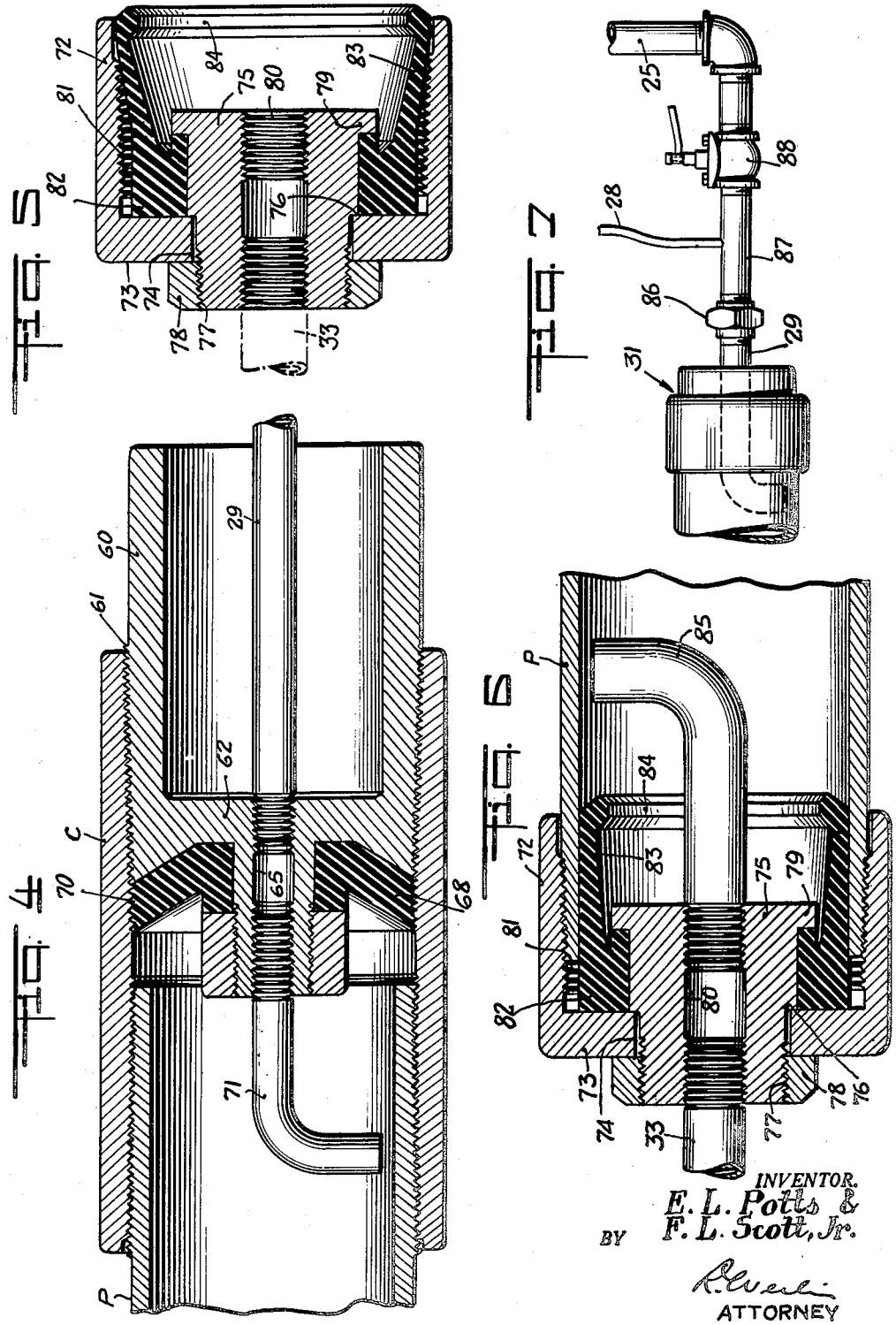

Patented Apr. 7, 1953

2,633,739

UNITED STATES PATENT OFFICE 2,633,739

APPARATUS FOR PRESSURE TESTING VESSELS, SUCH AS PIPE AND THE LIKE

Ernest L. Potts and Floyd L. Scott, Jr., Houston, Tex., assignors, by mesne assignments, to Cicero C. Brown, Houston, Tex.

Application March 3, 1949, Serial No. 79,486

9 Claims. (Cl. 73—37)

This invention relates to the pressure testing of vessels and particularly to the pressure testing of pipe for the detection of leaks or imperfections therein.

Testing of vessels designed to contain fluid under pressure is normally conducted by filling the vessel with a hydraulic fluid, generally water, and increasing the pressure on the fluid to the desired maximum test pressure. In the case of pipe, each individual joint must ordinarily be tested and where large quantities are involved, as is frequently the case, the normal testing procedure of closing the ends of each joint of pipe, filling it with water, pumping the water up to the desired test pressure, emptying the water from the joint, and removing the closures for transfer to the next joint, must be repeated as many times as there are joints of pipe to be tested. Such procedures, as performed by means of the more conventional apparatus and methods, are generally laborious, time-consuming, and wasteful of water.

In oil field operations, where many long strings of well casing, tubing, drill pipe, line pipe, and the like, are employed, and when leaks or imperfections in the pipe may create especially hazardous conditions, it has become a matter of common practice to pressure test each joint of pipe before use, including even new pipe, because it has been found that factory testing procedures may not always be completely reliable, and retesting is desirable as a matter of precaution. Also it is ordinarily desirable, in connection with oil field operations, to test the strings of pipe in the field, since strings of pipe are often re-used, being moved from one location to another. Such strings are usually tested before each use and testing facilities will not ordinarily be readily available as needed at each location.

Accordingly, the present invention has for its principal objects the provision of a pipe testing apparatus which is of relatively simple and compact form adapted particularly for easy portability; which is adapted for very speedy operation; which requires a minimum of operating labor; and which is capable of applying a wide range of test pressures.

An important object is the provision of an improved testing apparatus, by which pipe and the like may be pressure tested in a simple, speedy and efficient manner.

Another important object is to provide a pipe testing apparatus employing a piping arrangement by which the several operations may be effectively conducted by the manipulation of a single control valve.

Other and more specific objects and advantages of this invention will become apparent from the following detailed description when read in conjunction with the accompanying drawings which illustrate several useful embodiments in accordance with this invention.

In the drawings:

Fig. 1 illustrates, more or less diagrammatically, an assembly of pipe testing apparatus in accordance with one embodiment of this invention, and which may be employed for obtaining the results in accordance with this invention;

Fig. 2 is a longitudinal sectional view of an automatic valve employed to connect the testing apparatus illustrated in Fig. 1 to a pipe to be tested;

Fig. 3 is a longitudinal sectional view of one form of closure member employed for closing the end of a pipe being tested;

Fig. 4 is a longitudinal sectional view of the closure member of Fig. 3 showing it in place on a pipe end;

Fig. 5 is a view similar to Fig. 3 of another form of closure member;

Fig. 6 is a view corresponding to Fig. 4 showing the closure member of Fig. 5 applied to a pipe end; and Fig. 7 is a view illustrating another embodiment of a connection between the testing apparatus and a pipe to be tested.

Generally stated, this invention contemplates apparatus for the introduction of separate high-volume low-pressure and low-volume high-pressure streams of hydraulic fluid into a pipe to be tested. The high-volume low-pressure stream is employed primarily for rapid filling of the pipe, after which means is provided by which this stream is cut off and the low-volume high-pressure stream employed to raise the pressure in the pipe to the desired final test pressure. When this has been attained, the fluid in the pipe is discharged through the low-pressure high-volume stream, and suction createed by this discharging fluid is employed to cut off the flow of fluid to the low-volume high-pressure stream. The low-volume stream may be a portion diverted from the high-volume stream and thereafter boosted to the desired test pressure.

One apparatus embodiment may employ a relatively low-pressure high-volume pump for rapid filling of the vessel to be tested and a relatively high-pressure low-volume pump for completing the filling of the pipe and applying the desired degree of hydraulic pressure. The pumps may be compounded so that the low-pressure pump provides both the driving energy for the high-pressure pump and the fluid charge to be boosted thereby to the desired test pressure. Separate discharge pipes from the pumps may be connected to the vessel to be tested through a common connection fitted with a valve means by which the low and high-pressure streams may be successively introduced into the vessel and a suction-creating jet may be installed in the low-pressure supply pipe to empty the vessel there-through while automatically cutting off the feed to the high-pressure pipe. A piping arrangement may be provided by which all of the operations of filling and emptying the vessel may be performed by the manipulation of a single control valve.

Referring to Fig. 1, which illustrates an assembly of apparatus in accordance with an embodiment of this invention designed particularly for pressure testing pipe, in accordance with the method, as generally stated above, includes a relatively low pressure, high-volume pump 10, such as a conventional centrifugal pump adapted to discharge a particular quantity of liquid against some pre-determined maximum discharge pressure or head when run at a particular speed. Pump 10 is driven by any suitable prime mover 11, such as a conventional gasoline engine, electric motor or the like. A suction line 12 connects the suction of pump 10 to a storage tank 13 adapted to contain a supply of a suitable hydraulic fluid, preferably water, which is employed for applying the desired hydraulic pressure to the pipe or other vessel to be tested. Pump 10 is preferably compounded with a conventional reciprocating-type, positive displacement pump 14 driven in the usual manner by a fluid-driven power cylinder 15. The compounding arrangement between the pumps comprises a pipe 16 connecting the discharge of pump 10 to a header 17 having one branch pipe 18 connected to the suction side of pump 14, and a second branch pipe 19 connected to the intake side of power cylinder 15. By means of this arrangement, a portion of the hydraulic liquid may be discharged by pump 10, at its discharge pressure, directly into the intake of power cylinder 15 to supply motive fluid therefor, and another portion may, at the same time, be supplied to the suction of pump 14 for boosting of its pressure. The fluid exhausted from power cylinder 15 is discharged therefrom through a pipe 20 which may lead to any suitable disposal point but is preferably connected to tank 13 in order to conserve the fluid. It will be understood, of course, that power end 15 may be driven independently of pump 10.

A by-pass pipe 21 has one end connected to header 17 at a point intermediate the connection thereto of pipe 16 and of branch pipes 18 and 19, and its other end connected into tank 13. An ejector 22, which may be of the conventional Venturi-type, is installed at an intermediate point in by-pass pipe 21 and a valve 23, which may be of any conventional form but preferably of a relatively quick-opening type, is interposed in by-pass pipe 21 between ejector 22 and tank 13. A pipe 24 has one end thereof connected to by-pass pipe 21 at a point intermediate ejector 22 and header 17 and its other end to a flexible relatively low pressure type hose 25, which is connected into the casing of an automatic valve, designated generally by the numeral 26, adapted to control the movement of testing fluid into and out of pipe P. The construction of automatic valve 26 will be described in detail hereinafter in connection particularly with Fig. 2. A pipe 27 has one end connected to the discharge of pump 14 and its other end to a flexible high pressure type tube 28 which is also connected to the casing of valve 26, and is of substantially smaller diameter than hose 25.

To connect automatic valve 26 to pipe P, a short pipe nipple 29 is detachably connected to the valve casing by means of a conventional screw type union 30. The opposite end of nipple 29 is screwed into a removable closure member, designated generally by the numeral 31, which is adapted to form a fluid-tight closure for one end of pipe P. The opposite end of pipe P is closed by another removable closure member, designated generally by the numeral 32, and designed to form a fluid-tight closure for the opposite end of the pipe. Closure member 32 is provided with a bleed-off connection 33 which is controlled by a valve 34, which may be of any suitable and conventional form adapted to control the movement of fluid through connection 33. In the form more or less diagrammatically illustrated, valve 34 includes a ball type closure 35 which is adapted to cooperate with a seat 36 to close-off connection 33 in response to the outward thrust of fluid attempting to escape from pipe P. Closure 35 is provided with a stem 37 extending exteriorly of the valve and suitably connected to an operating lever 38, which, by appropriate movement, will thrust closure member 35 away from seat 36 to open connection 33. Closure members 31 and 32 may be of any appropriate and generally conventional form which will provide fluid-tight closures for the ends of pipe P. However, in order to improve the speed of and efficiency of the testing operation, these closure members may be of the novel form illustrated in Figs. 3 and 4, respectively, and will be described in detail hereinafter.

Automatic valve 26 is shown in detail in Fig. 2 and comprises a generally tubular casing 40, the interior of which is divided at an intermediate point into a pair of axially aligned chambers 41 and 42, respectively, of larger and smaller internal diameters, by means of an annular shoulder 43, the bore of which provides a communicating passageway between chambers 41 and 42. Chamber 41 is provided with an inlet port 44, of relatively small area, extending through the side wall thereof, and chamber 42 is provided with an inlet port 45, of substantially larger area than inlet port 44, extending through the wall thereof. Tube 28 is adapted to be connected to inlet port 44, while hose 25 is adapted to be connected to inlet port 45. A valve disk 46 is disposed transversely of chamber 41 and is dimensioned to reciprocate freely therein. Valve disk 46 is provided with a central boss 47 adapted to extend into the bore of chamber 42 and form a close sliding fit therein. An annular packing ring 48 is suitably disposed about the periphery of boss 47 to form a fluid-tight seal between boss 47 and the adjacent wall of chamber 42 when engaged therewith. The inner peripheral edge of shoulder 43 is machined to form a tapered valve seat 49 and boss 47 is provided adjacent disk 46 with a complementary tapered seating surface 50, adapted when engaged with seat 49 to close communication between chambers 41 and 42. A cylindrical stem 51 is connected to boss 47 and extends axially through chamber 42 passing out of the end of casing 40 through a cap 52 which forms a closure for the outer end of chamber 42 and a stuffing box for the outer end of stem 51. A conventional type seal ring 53 is suitably disposed between cap 52 and stem 51 and the outer end of the latter is provided with a disk 54 held in place on the stem by means of a cap screw 55. Disk 54 forms a stop member engageable with the outer end of cap 52 to limit the inward movement of stem 51 and its connected parts. A coil spring 56 surrounds stem 51 and is normally held in compression between boss 47 and cap 52 and is adapted to normally urge valve disk 46 inwardly away from shoulder 43 and thereby open communication between chambers 41 and 42, as shown in broken lines in Fig. 2. The outer end of the wall of chamber 41 is threaded externally at 57 to form one member of union 30 and is adapted to engage with a mating union member 58 and to be joined therewith by means of the usual screw collar 59, which engages with threads 57. Pipe nipple 29 is screwed into the outer end of union member 58 to form the above-described connection between automatic valve 26 and the pipe closure member 31.

Joints of pipe adapted for screw connection will ordinarily be provided with externally threaded ends and the abutting ends of successive joints will be connected together by means of internally threaded screw couplings or collars such as collars C (Fig. 1). Normally, each joint of pipe will be supplied for use with a collar already in place on one end of the pipe joint. In such cases, therefore, each joint of pipe will have one externally threaded or male end, and an internally threaded or female end. Under such circumstances, closure members 31 and 32 will necessarily differ sufficiently in form to complement the particular form of pipe end to which they are to be connected.

Figs. 3 and 4 illustrate a form of closure member 31 designed particularly for application to a female pipe end. Figs. 5 and 6 illustrate a form of closure member 32 applicable to a male pipe end.

Referring first to Figs. 3 and 4, closure member 31 is in the form of a plug type closure which comprises a tubular body 60 having external threads 61 about its inner end portion mating with the threads in collar C into which the plug is to be screwed. Body 60 is provided with an inner end closure wall 62 having a generally concave end face 63 facing toward the pipe end and a tubular boss 64 extending axially forwardly therefrom. Boss 64 has an axial bore 65 which is internally threaded at its opposite ends. The outer end of boss 64 is externally threaded at 66 to receive a nut 67. A sealing cup 68, constructed of rubber or other similar resilient material and having a forwardly opening mouth, is provided with a central hub 69 and is adapted to surround boss 64 and to seat snugly against end face 63. The outer peripheral edge of cup 68 is provided with threads 70, identical in form with threads 61, to normally form a continuation of the latter. Nut 67, when screwed on the end of boss 64, bears against the outer end of hub 67 to hold cup 68 firmly in place against end wall 62.

Closure member 31, of the form above described, will be applied to a female type pipe end, as by inserting it into collar C (Fig. 4), and by making it up in the collar threads to whatever degree of tightness may be obtained merely by the use of the hands. Threads 70 will, of course, engage the collar threads in advance of threads 61. Thereafter, when fluid pressure is applied to interior of cup 68, the resulting compression thereof against end wall 62 will force the threaded edge thereof radially into tighter engagement with the collar threads, thus forming a fluid-tight seal therewith. The greater the pressure exerted against the inner surfaces of the cup, the tighter will be the seal formed thereby. When the pressure is released, the cup will retract to its normal dimensions and the closure member may be unscrewed by hand-turning. The end of bore 65, which is directed toward the pipe end, is adapted to receive a curved nipple 71 which extends into the pipe and functions in a manner to be described hereinafter. The opposite end of bore 65 is adapted to receive nipple 29.

Referring now to Figs. 5 and 6, closure member 32, which is illustrated thereby, is in the form of a cap-type closure which comprises a tubular body 72 having an outer end closure wall 73 provided with an axial aperture 74 through which a tubular bushing 75 extends. Bushing 75 is enlarged at a point intermediate its ends to form an abutment 76 adapted to engage the inner face of end wall 73 adjacent aperture 74. The outer end of bushing 75 is externally threaded at 77 to receive a jam nut 78 which when screwed down over bushing 75 against the outer face of end wall 73 acts to draw the bushing toward the end wall. The inner end of bushing 75 is provided with an annular outwardly extending flange 79. An axial bore 80, threaded internally at its opposite ends extends through bushing 75 from end to end thereof. The bore of body 72 is provided with internal threads 81 adapted to threadedly receive a male threaded pipe end when the closure member is screwed down over the pipe end to form a closure therefor. A sealing cup 82, constructed of rubber or other similar resilient material, is inserted in the bore of body 72 surrounding bushing 75 and mounted thereon between the inner face of end wall 73 and flange 79 which serves to clamp the bottom of cup 82 against end wall 73 when jam nut 78 is screwed down on the outer end of bushing 75. Cup 82 includes a relatively thin, flexible wall 83 which extends toward the open end of body 72 and flares outwardly toward the inner wall of body 72. The outer end of wall 83 is provided with an inwardly curving annular lip 84.

Closure member 32, of the form above-described, will be applied to the male pipe end, as by screwing it over the externally threaded end of the pipe (Fig. 6). The edge of the pipe, as it enters the bore of body 72, will enter the annular space between the body and cup 82. Flexible wall 83 of the cup will enter the bore of the pipe end and as body 72 is screwed down over the pipe end, will slide along the inner wall of the pipe in frictional engagement therewith. Body 72 will be screwed down over the end of the pipe to whatever degree of tightness may be effected solely by the use of the hands of the operator. When fluid pressure is exerted from the inside of the pipe against the interior of cup 82, the latter will be compressed generally radially against the inner wall of the pipe and form a fluid-tight seal therewith which increases in tightness with increases in the pressure applied. With this construction, as in the case of closure member 31, it will be evident that no fluid can escape from the pipe despite the fact that threads 81 may be made up relatively loosely on the pipe end. When the pressure against the interior of cup 82 is released, the closure member may be readily unscrewed by hand. Accordingly, both forms of the described closure members lend themselves to quick attachment to and removal from the respective pipe ends. The end of bore 80 which is directed toward the pipe end is adapted to receive a curved nipple 85 which extends into the pipe, and the opposite end of bore 80 is adapted to receive bleed-off connection 33.

It will be understood that where the pipe to be tested has both ends of the female form, the closure members may both be of the form of closure member 31, and where both pipe ends are of the male form, both closures may be of the form of closure member 32. Closure members of any other more conventional forms may be used but will ordinarily not permit the speed and efficiency of operation which is possible with the novel forms of closure members herein described.

The above-described apparatus may be employed to test a pipe, such as pipe P having collar C on one end thereof, in the following manner:

Pump 10 will be started with control valve 23 open and the pump will begin circulating water from tank 13 through suction pipe 12, discharging the water back to tank 13 through discharge pipe 16, header 17, by-pass pipe 21, ejector 22 and valve 23. With valve 23 open, the flow of water through ejector 22 will effectively prevent any appreciable quantity of water from passing into branch pipes 18 and 19 and pipe 24 because of the suction created therein by the normal functioning of ejector 22.

Closure members 31 and 32 will be applied to the ends of the pipe, in the manner previously described, nipple 71 at the inlet end of pipe P being turned downwardly toward the bottom of the pipe and nipple 85 turned upwardly toward the top of the pipe, as illustrated particularly in Fig. 1. Nipple 29 will be connected to automatic valve 26 by means of union 30. Control valve 23 will now be closed. This will cut-off return of the water to tank 13 through pipe 21 and the water, under the discharge pressure of pump 10 will now enter pipes 18, 19 and 24. That portion of the water which enters pipe 19 will flow through power cylinder 15 of the high pressure pump and will furnish the power for driving pump 14. The exhaust water from power cylinder 15 will be discharged therefrom through pipe 20 and returned thereby to tank 13. That portion of the water entering pipe 18 will flow to the intake of pump 14 and will be discharged therefrom through pipe 27 and into tube 28 at a considerably elevated pressure. That portion of the water entering pipe 24 will flow therefrom into hose 25. The water flowing through hose 25 will be considerably larger in volume than that flowing through tube 25, and since it is under the discharge pressure only of pump 10 will be at considerably lower pressure than that flowing through tube 28, the pressure of which has been boosted by pump 14.

At this early stage of operations pipe P will be empty and automatic valve 26 will be open, that is, valve disk 46 will be moved to the left to the position shown in broken lines in Fig. 2 by the pressure of coil spring 56 since there will at this stage be no back pressure against the valve from the interior of pipe P. The low pressure, high-volume stream of water from hose 25 will, therefore, enter valve 26 through inlet port 45 and will flow through chamber 42 past the open valve into chamber 41 and thence through nipple 29 into the interior of pipe P. The latter will be quickly filled by the high-volume stream of water thus introduced, valve 34 being held open to permit escape of air as the pipe is filled and closed as soon as water appears at the bleed-off connection. While the large volume stream of water is entering valve 26 through hose 25, a small stream of water will also be entering through tube 28. This stream, however, because of its small volume, will have little effect while pipe P is filling. As soon, however, as the latter becomes filled with water, back pressure will develop opposing the entrance of additional water and as soon as this back pressure develops a differential pressure across the valve which exceeds the pressure of coil spring 56, valve disk 46 will be forced to the right to the position shown in full lines in Fig. 2 and will close off the valve against the further introduction of water by the low pressure pump. At the same time, high pressure pump 14 will continue to force a small stream of water into pipe P through tube 28 until the pressure in pipe P has been built up to the desired test pressure. It will be understood that when the flow from hose 25 has been cut-off by the initial filling of pipe P, as described, the full discharge from pump 10 will be directed through branch pipes 18 and 19 into power cylinder 15, and the intake of high pressure pump 14. This pump and its power end are dimensioned to boost thhe pressure of the water to whatever pressure may be desired to apply to pipe P for testing purposes. The boosting ratio of pump 14 may be, for example, 100 to 1, so that with a water pressure at the intake of 100 pounds per square inch, the discharge pressure will be approximately 10,000 pounds per square inch. Since pump 10 is preferably a centrifugal pump, which is normally designed to pump a pre-determined volume against a particular head at a pre-determined speed, the speed of pump 10 can be set for a fixed discharge head and this will automatically limit the maximum discharge pressure of pump 14. Thus, if pump 10 is set to pump against a maximum head of 100 pounds per square inch, pump 14 will boost the water supplied at this pressure to a maximum pressure of about 10,000 pounds per square inch. Accordingly, when pipe P has been substantially filled by the low pressure, high-volume stream of water and valve 26 closes, as described above, additional water will continue to be introduced into pipe P through tube 28 by pressure of pump 14 until the maximum discharge pressure of the latter has been attained and the pipe will thus have been pressure tested up to this maximum pressure. Any desired test pressure may be thus applied to pipe P merely by setting pump 10 to operate at a pre-determined speed.

By the above-described operations, and with the apparatus arranged as described, only a very short interval of time will normally be required to raise the pressure in pipe P to the test pressure. This pressure will be maintained only momentarily to make sure there are no leaks in the pipe and thereupon, bleed valve 34 will be opened to bleed off the pressure from pipe P, the upturned nipple 85 preventing any appreciable loss of water by this operation. At the same time, control valve 23 will be opened. Instantly, upon opening of valve 23, the water discharging from pump 10 will be diverted through pipe 21 and will flow through ejector 22 back to tank 13. Suction will be created thereby in pipe 24 which will start a flow of water back through hose 25 and cut off the flow of water to branch pipes 18 and 19. Also, immediately upon relief of the pressure in pipe P, coil spring 56 will expand, again forcing valve disk 46 to the left and opening communication between chambers 41 and 42. The suction in pipe 24 and hose 25 created by the action of ejector 22 will quickly suck all the water back out of pipe P through the downturned nipple 71. Bleed-off valve 34 will be kept open during this back flow operation to break any vacuum in pipe P created by the withdrawal of the water therefrom. As soon as pipe P has been emptied of water, closure members 31 and 32 are removed, connected to another joint of pipe, and the above described operations are repeated. While the operations of disconnecting the closure members and reconnecting them to another pipe joint are being performed, pumps 10 and 14 may continue to run, as the former will be merely circulating water to and from tank 13, as initially described, while the latter stops or is idling very slowly since the flow of water to its power end and to its intake connections will have been effectively cut off by the suction of ejector 22. By means of the above-described apparatus, pipe may be pressure tested very quickly. It will be seen that aside from the operations of connecting and disconnecting the closure members to the pipe ends, the principal mechanical operation involved is the opening and closing of control valve 23. The filling and emptying of the pipe are effected by this single operation. Where closure members of the special form described are employed, the operations of connecting and disconnecting them is a simple hand operation which may be quickly performed since the use of wrenches to make up the closure members on the pipe ends is eliminated. A high pressure swivel 86, as indicated in Fig. 7, may be interposed in nipple 29 between closure member 31 and the testing water supply, to avoid the necessity of loosening union 30 in order to rotate closure member 31 during its connection and disconnection from pipe P. This will further speed up the operation. The speed with which pipe of various sizes may be pressure tested by the described apparatus is illustrated by the following examples: 7" casing: 12-15 joints (30 foot) per hour; 5½" casing: 15-20 joints (30 foot) per hour; 2" pipe: 70 joints per hour. In these several examples, pump 10 was of a size designed to pump at a rate of up to 125 gallons per minute at the relatively low pressure selected to give the desired final high test pressure for each size of pipe, when boosted, as described by pump 14.

Fig. 7 illustrates a manually operated form of connection between the test apparatus and the pipe which may be used in place of automatic valve 26. While this type of connection will necessarily reduce somewhat the speed and efficiency of the testing operations, all of the other advantages of the compounded pump arrangement and particularly of the use of the control valve 23 and ejector 22 for rapid filling and emptying of the pipe may be retained. In this embodiment, nipple 29 is connected through the high pressure swivel 86 to pipe nipple 87 into which tube 28 and hose 25 are connected at spaced points. A quick opening type block valve 88, of any conventional form, is installed in nipple 87 between the points of connection thereto of tube 28 and hose 25. With this embodiment, when connected to the pipe, it will be necessary to open block valve 88 when control valve 23 is closed. This will permit the flow of high volume, low pressure water into the pipe to substantially fill it, whereupon block valve 88 is closed and the high pressure, low-volume stream of water entering through tube 28 will complete the filling and boost the pressure in the pipe to the desired test pressure, in exactly the same manner as previously described. Thereafter block valve 88 will be opened substantially contemporaneously with the opening of control valve 23 to effect the removal of water from pipe P in the previously described manner.

The pipe testing apparatus herein described lends itself to a very compact construction which may be mounted in its entirety on a truck or trailer and moved from place to place. This is particularly advantageous for use in oil fields, for example, where large quantities of pipe of various sizes must be tested before being run into a well or connected into pipe lines. The entire testing apparatus may thus be transported quickly and easily from place to place as required, carrying its own water supply, since little water will be lost in the testing operations employing the described apparatus and only a relatively small volume of water is necessary even for the largest size pipe.

It will be evident that although the above-described apparatus has been described and illustrated in its application to testing pipe, the apparatus may be employed successfully for pressure testing other types of vessels, and this invention is intended, therefore, to have more general application than that set forth merely by way of illustration.

It will be understood that numerous changes and modifications may be made in the details of the herein described illustrative embodiments of this invention without departing from the scope of the appended claims but within the spirit of this invention.

What we claim and desire to secure by Letters Patent is:

1. Apparatus for pressure testing vessels such as pipe and the like, comprising, an inlet connection for supplying hydraulic fluid to a vessel to be tested, separate relatively low- and high-pressure fluid supplying conduits connected to spaced points in said inlet connection, means for supplying relatively low- and high-pressure fluid respectively to said low- and high-pressure conduits, a block valve interposed in said connection to control communication therein between said points, a suction-creating means having its inlet end in communication with said low-pressure conduit at a point in advance of said block valve, and a control valve for the discharge of said suction-creating means.

2. Apparatus for pressure testing vessels such as pipe and the like, comprising, an inlet connection for supplying hydraulic fluid to a vessel to be tested, separate relatively low- and high-pressure fluid supplying conduits connected to spaced points in said inlet connection, a block valve interposed in said connection to control communication therein between said points, suction-creating means having its inlet end in communication with said low-pressure conduit at a point in advance of said block valve, a control valve for the discharge of said suction-creating means, and relatively low- and high-pressure pump means having their discharges connected respectively to said low- and high-pressure conduits.

3. Apparatus for pressure testing vessels such as pipe and the like, comprising, an inlet connection for supplying hydraulic fluid to a vessel to be tested, separate relatively low- and high-pressure fluid-supplying conduits connected to spaced points in said inlet connection, a block valve interposed in said connection to control communication therein between said points, suction-creating means having its inlet end in communication with said low-pressure conduit at a point in advance of said block valve, a control valve for the discharge of said suction-creating means, a relatively low-pressure pump means having its discharge connected to said low-pressure conduit, a branch conduit connecting said high-pressure conduit to said low-pressure conduit at a point between the discharge of said low-pressure pump means and said suction-creating means, and pressure boosting means operatively interposed in said branch conduit.

4. Apparatus for pressure testing vessels such as pipe and the like, comprising, an inlet connection for supplying hydraulic fluid to a vessel to be tested, separate relatively low- and high-pressure fluid-supplying conduits connected to spaced points in said inlet connection, a block valve interposed in said connection to control communication therein between said points, suction-creating means having its inlet end in communication with said low-pressure conduit at a point in advance of said block valve, a control valve for the discharge of said suction-creating means, a low-pressure pump means having its discharge connected to said low-pressure conduit, a branch conduit connecting said high-pressure conduit to said low-pressure conduit at a point between the discharge of said low-pressure pump and said suction-creating means, and pressure boosting means operatively interposed in said branch conduit, said boosting means including a relatively high-pressure pump having a fluid-driven power end, and a fluid-supplying connection between said power end and the discharge of said low-pressure pump means.

5. Apparatus for pressure testing vessels such as pipe and the like, comprising, an inlet connection for supplying hydraulic fluid to a vessel to be tested, separate relatively low- and high-pressure fluid-supplying conduits connected to spaced points in said inlet connection, a block valve interposed in said connection to control communication therein between said points, suction-creating means having its inlet end in communication with said low-pressure conduit at a point in advance of said block valve, a hydraulic fluid supply tank, a pipe connection between the discharge end of said suction-creating means and said tank, valve means in said pipe connection for controlling the discharge of said suction-creating means, a relatively low-pressure pump means having its suction connected to said tank and its discharge connected to said low-pressure conduit, a branch conduit connecting said high-pressure conduit to said low-pressure conduit at a point between the discharge of said low-pressure pump means and said suction-creating means, and pressure-boosting means operatively interposed in said branch conduit.

6. Apparatus for pressure testing vessels such as pipe and the like, comprising, an inlet connection for supplying hydraulic fluid to a vessel to be tested, separate relatively low- and high-pressure fluid supplying conduits connected to spaced points in said inlet connection, automatic valve means interposed in said connection to control communication therein between said conduits, a suction-creating means having its inlet end in communication with said low-pressure conduit at a point in advance of said valve means, and a control valve for the discharge of said suction-creating means, said automatic valve means being normally open and adapted to be closed when the pressure on the vessel side of said valve exceeds that on the opposite side of said valve.

7. Apparatus for pressure testing pipes, comprising, a pair of fluid-tight closure members removably connectible to the opposite ends of a pipe to be tested, an inlet connection to one of said closure members, a tubular valve casing having one end connected to said connection and a low-pressure inlet passageway adjacent the opposite end, a high-pressure inlet passageway at an intermediate point along said casing, a normally open differential-pressure operated valve disposed in said casing to control communication between said inlet passageways, separate relatively high- and low-pressure fluid-supplying conduits respectively connected to said high- and low-pressure inlet passageways, a relatively low-pressure high-volume pump connected to said low-pressure conduit, a relatively high-pressure low-volume pump connected to said high-pressure conduit and driven by a portion of said fluid discharged by said low-pressure pump, a pipe for supplying a portion of said fluid discharged from said low-pressure pump to the intake of said high-pressure pump, a tank containing a supply of said fluid, a pipe connecting said tank to the suction of said low-pressure pump, a by-pass pipe between said low-pressure conduit and said tank, an ejector interposed in said by-pass pipe, and a control valve interposed in said by-pass pipe between said ejector and said tank.

8. Apparatus for testing pipe, comprising, a pair of closure members removably attachable to the opposite ends of a pipe to be tested, an inlet connection communicating with the interior of said pipe through one of said closure members, separate relatively low- and high-pressure hydraulic fluid supplying conduits connected to spaced points in said inlet connection, means for supplying relatively low- and high-pressure fluid respectively to said low- and high-pressure conduits, valve means interposed in said connection to control communication therein between said points, a suction-creating means having its inlet end in communication with said low-pressure conduit at a point in advance of said valve means, and a control valve for the discharge of said suction-creating means.

9. An apparatus according to claim 8, wherein said closure members include resilient sealing elements expandible by fluid pressure within said pipe to form fluid-tight seals therewith.

ERNEST L. POTTS.
FLOYD L. SCOTT, Jr.

REFERENCES CITED

The following references are of record in the file of this patent:

UNITED STATES PATENTS

| Number | Name | Date |
|---|---|---|
| 909,950 | Schreidt | Jan. 19, 1909 |
| 1,811,138 | Lassman | June 23, 1931 |
| 2,062,527 | Postlewait | Dec. 1, 1936 |
| 2,135,721 | Landenberger | Nov. 8, 1938 |
| 2,497,193 | Webb | Feb. 14, 1950 |

FOREIGN PATENTS

| Number | Country | Date |
|---|---|---|
| 370,334 | Great Britain | Apr. 7, 1932 |
| 551,566 | Great Britain | Mar. 1, 1943 |